United States Patent
Rajkotia et al.

(10) Patent No.: US 7,508,797 B2
(45) Date of Patent: Mar. 24, 2009

(54) METHOD AND SYSTEM FOR PROVIDING A BASE STATION-ASSIGNED PUBLIC LONG CODE MASK

(75) Inventors: Purva R. Rajkotia, Plano, TX (US); William J. Semper, Richardson, TX (US); Chanakya Bandyopadhyay, Richardson, TX (US); Sanjaykumar Kodali, Dallas, TX (US)

(73) Assignee: Samsung Electronics Co. Ltd., Suwon-si (KR)

( * ) Notice: Subject to any disclaimer, the term of this patent is extended or adjusted under 35 U.S.C. 154(b) by 762 days.

(21) Appl. No.: 10/837,535

(22) Filed: Apr. 30, 2004

(65) Prior Publication Data

US 2004/0259596 A1 Dec. 23, 2004

Related U.S. Application Data

(60) Provisional application No. 60/478,588, filed on Jun. 13, 2003.

(51) Int. Cl.
*H04B 7/216* (2006.01)
*H04Q 7/20* (2006.01)

(52) U.S. Cl. ............... 370/335; 370/342; 455/456.1; 455/456.5

(58) Field of Classification Search .............. 370/335, 370/342; 375/140, 146, 147; 455/456.1, 455/456.2, 456.5, 456.6
See application file for complete search history.

(56) References Cited

U.S. PATENT DOCUMENTS

| | | | | |
|---|---|---|---|---|
| 5,636,123 A * | 6/1997 | Rich et al. | ................ | 701/207 |
| 6,201,871 B1 * | 3/2001 | Bostley et al. | ............. | 380/249 |
| 6,792,270 B1 * | 9/2004 | Neumann | ................ | 455/432.1 |
| 7,069,011 B2 * | 6/2006 | Dalal et al. | ................. | 455/450 |
| 7,092,722 B1 * | 8/2006 | Oh et al. | .................. | 455/456.1 |
| 2004/0171383 A1 * | 9/2004 | Fingerhut et al. | ........ | 455/435.1 |
| 2004/0202127 A1 * | 10/2004 | Loh et al. | .................... | 370/331 |
| 2004/0213280 A1 * | 10/2004 | Patel | ......................... | 370/441 |
| 2005/0192024 A1 * | 9/2005 | Sheynblat | ................ | 455/456.1 |
| 2005/0232141 A1 * | 10/2005 | Meier et al. | ................ | 370/209 |
| 2007/0104196 A1 * | 5/2007 | An et al. | ..................... | 370/390 |

* cited by examiner

*Primary Examiner*—Firmin Backer
*Assistant Examiner*—Farah Faroul

(57) ABSTRACT

A method for providing a base station-assigned public long code mask (PLCM) for a wireless communication device is provided that includes generating a base transceiver subsystem (BTS) identifier for a base transceiver subsystem. A reusable wireless communication device (WCD) identifier is generated for the wireless communication device when the wireless communication device communicates with the base transceiver subsystem. A PLCM that includes the BTS identifier and the WCD identifier is assigned to the wireless communication device.

28 Claims, 4 Drawing Sheets

METHOD AND SYSTEM FOR PROVIDING A BASE STATION-ASSIGNED PUBLIC LONG CODE MASK

CROSS-REFERENCE TO RELATED APPLICATIONS AND CLAIM OF PRIORITY

The present invention is related to that disclosed in U.S. Provisional Patent Application Ser. No. 60/478,588, filed Jun. 13, 2003, entitled "System and Method for Providing a Base Station Assigned Public Long Code Mask". U.S. Provisional Patent Application Ser. No. 60/478,588 is assigned to the assignee of the present application. The subject matter disclosed in U.S. Provisional Patent Application Ser. No. 60/478,588 is hereby incorporated by reference into the present disclosure as if fully set forth herein. The present invention hereby claims priority under 35 U.S.C. §119(e) to U.S. Provisional Patent Application Ser. No. 60/478,588.

TECHNICAL FIELD OF THE INVENTION

The present invention is directed in general to wireless telecommunications networks and, more specifically, to a method and system for providing a base station-assigned public long code mask.

BACKGROUND OF THE INVENTION

A mobile station communicating with a base station in a conventional wireless network is assigned a Public Long Code Mask (PLCM). Each mobile station uses its unique PLCM during transmission in order to avoid cross-talk (i.e., collisions) with other mobile stations. The PLCM is typically generated from the Electronic Serial Number of the mobile station.

However, because of the large number of mobile stations (e.g., cell phones, wireless PCs, and other wireless terminals) now being used to communicate over wireless networks, the available supply of Electronic Serial Numbers is becoming exhausted. This may lead to situations in which wireless terminals having the same ESN may attempt to communicate with the same base station. Therefore, new techniques for generating a PLCM are being considered. These techniques include a Mobile Equipment Identifier (MEID)-generated PLCM and a base station-assigned PLCM.

For base station-assigned PLCMs, there is no standard format to be used by the base station for PLCM assignment. This results in complicated algorithms that must be used by the base station for managing (or provisioning) the PLCMs, in order to guarantee that no collisions occur between different mobile stations, which would put the privacy of the user at risk. In addition, this may also lead to inter-operability issues between the base stations of different vendors.

Therefore, there is a need in the art for improved techniques for managing the assignment of PLCMs in a wireless network. In particular, there is a need for a standards technique to be used by base stations to assign unique PLCMs to mobile stations communicating in a wireless network.

SUMMARY OF THE INVENTION

In accordance with the present invention, a method and system for providing a base station-assigned public long code mask (PLCM) are provided that substantially eliminate or reduce disadvantages and problems associated with conventional methods and systems.

According to one embodiment of the present invention, a method for providing a base station-assigned PLCM for a wireless communication device is provided that includes generating a base transceiver subsystem (BTS) identifier for a base transceiver subsystem. A reusable wireless communication device (WCD) identifier is generated for the wireless communication device when the wireless communication device communicates with the base transceiver subsystem. A PLCM that includes the BTS identifier and the WCD identifier is assigned to the wireless communication device.

According to another embodiment of the present invention, a base station that is operable to provide a base station-assigned PLCM for a wireless communication device is provided that includes a base transceiver subsystem and a PLCM assigner. The base transceiver subsystem has a unique characteristic. The PLCM assigner is operable to generate a BTS identifier for the base transceiver subsystem based on the unique characteristic, to generate a reusable WCD identifier for the wireless communication device when the wireless communication device communicates with the base transceiver subsystem, and to assign to the wireless communication device a PLCM that includes the BTS identifier and the WCD identifier.

According to yet another embodiment of the present invention, a system for providing a base station-assigned PLCM for a wireless communication device is provided that includes a computer-processable medium and logic stored on the computer-processable medium. The logic is operable to generate a BTS identifier for a base transceiver subsystem based on latitude and longitude information for the base transceiver subsystem, to generate a reusable WCD identifier for the wireless communication device when the wireless communication device communicates with the base transceiver subsystem, and to assign to the wireless communication device a PLCM that includes the BTS identifier and the WCD identifier.

Technical advantages of one or more embodiments of the present invention include providing an improved method for providing a base station-assigned PLCM. In a particular embodiment, the PLCM is defined in terms of a characteristic unique to the base transceiver subsystem, such as the latitude and longitude of the base transceiver subsystem. As a result, the need for using complex algorithms is eliminated and the probability of collision is reduced to nearly zero. Accordingly, security and privacy of mobile users is improved. In addition, the technique of the present invention does not impact the soft handoff mechanism of the mobile stations and PLCM assignment is independent of both vendor and network, which eliminates interoperability issues.

Other technical advantages will be readily apparent to one skilled in the art from the following figures, description, and claims.

Before undertaking the DETAILED DESCRIPTION OF THE INVENTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior uses, as well as to future uses of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts.

DETAILED DESCRIPTION OF THE INVENTION

FIGS. 1 through 5, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged wireless network.

Figure 1:
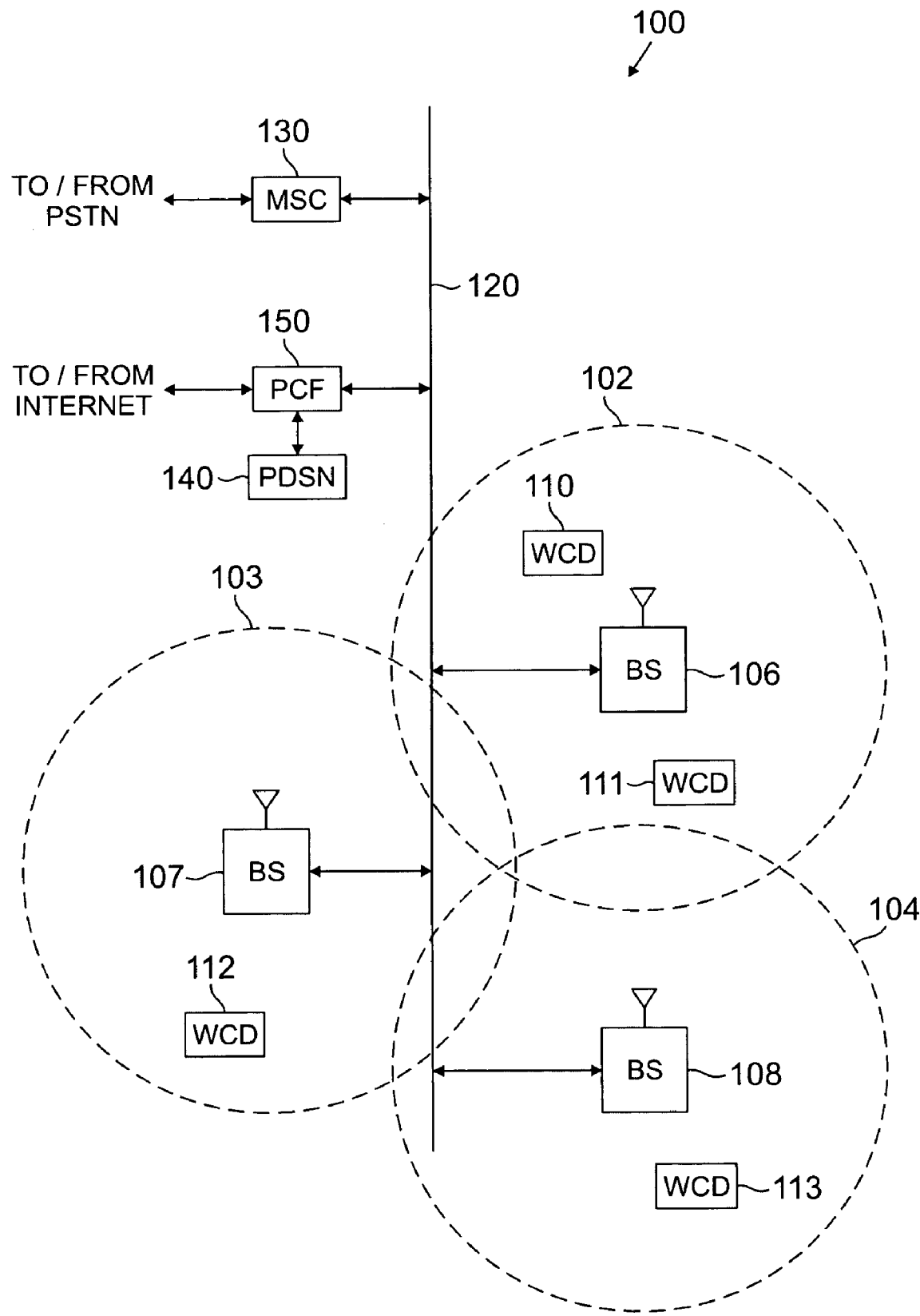
FIG. 1 is a block diagram illustrating a general overview of a wireless network that is operable to provide a base station-assigned public long code mask in accordance with one embodiment of the present invention.

FIG. 1 is a block diagram illustrating a general overview of a wireless network 100 that is operable to provide a base station-assigned public long code mask in accordance with one embodiment of the present invention. The wireless network 100 comprises a plurality of cell sites 102-104, each of the cell sites 102-104 comprising a base station (BS) 106-108. As used herein, "each" means every one of at least a subset of the identified items.

Each base station 106-108 is operable to communicate with a plurality of wireless communication devices (WCD) 110-113. According to one embodiment, the base stations 106-108 are operable to communicate with the wireless communication devices 110-113 over code division multiple access (CDMA) channels according to the IS-2000 standard (i.e., CDMA2000). Each of the wireless communication devices 110-113 may comprise a mobile wireless device, such as a cell phone, a PCS handset, a personal digital assistant (PDA) handset, a portable computer, a telemetry device, or the like, or any other suitable device operable to communicate with one of the base stations 106-108 via wireless links, including a stationary wireless device.

Dotted lines show the approximate boundaries of the cell sites 102-104 in which the base stations 106-108 are located. The cell sites 102-104 are shown approximately circular for the purposes of illustration and explanation only. It will be understood that the cell sites 102-104 may have other irregular shapes, depending on the cell configuration selected and natural and man-made obstructions.

The cell sites 102-104 comprise a plurality of sectors (not shown), where a directional antenna coupled to the base station 106-108 may provide service for each sector. The embodiment of FIG. 1 illustrates the base station 106-108 in the center of the cell site 102-104. In an alternate embodiment, the directional antennas may be positioned in corners of the sectors or in any other suitable location. The system of the present invention is not limited to any particular cell site configuration.

As described in more detail below in connection with FIG. 2, each base station 106-108 may comprise a base station controller and at least one base transceiver subsystem. The base station controllers are operable to manage wireless communications resources, including the base transceiver subsystems, for specified cells 102-104 within the wireless network 100. The base transceiver subsystems comprise the radiofrequency (RF) transceivers, antennas, and other electrical equipment located in each cell site 102-104. This equipment may include air conditioning units, heating units, electrical supplies, telephone line interfaces and RF transmitters and RF receivers.

As described in more detail below, each base station 106-108 comprises a PLCM assigner that is operable to assign PLCMs to the wireless communication devices 110-113 when calls are initiated or hard handoffs to the base station 106-108 are performed. Each PLCM assigned by the PLCM assigner is based on a unique characteristic of the base transceiver subsystem through which the wireless communication device 110-113 is communicating and based on an identifier for the wireless communication device 110-113. For a particular embodiment, the unique characteristic of the base transceiver subsystem on which the PLCM is based is the latitude and longitude of the base transceiver subsystem.

The base stations 106-108 are also operable to transfer voice and data signals between each other and the public switched telephone network (PSTN) (not shown) via communication line 120 and a mobile switching center (MSC) 130. The base stations 106-108 are also operable to transfer data signals, such as packet data, back and forth from the Internet (not shown) via communication line 120 and a packet data server node (PDSN) 140. The packet control function (PCF) unit 150 may be operable to control the flow of data packets between base stations 106-108 and the PDSN 140. The PCF unit 150 may be implemented as part of the PDSN 140, as part of the base stations 106-108, or as a stand-alone device that communicates with the PDSN 140, as shown in FIG. 1. Communication line 120 is also operable to establish connections for voice and data circuits between the MSC 130 and the base stations 106-108.

The communication line 120 may be any suitable connection means, including a T1 line, a T3 line, a fiber optic link, or any other type of data connection. The connections on line 120 may transmit analog voice signals or digital voice signals in pulse code modulated (PCM) format, Internet Protocol (IP) format, asynchronous transfer mode (ATM) format, or the like. According to an advantageous embodiment of the present invention, line 120 also provides an IP connection that transfers data packets between the base stations 106-108 of the wireless network 100. Thus, line 120 may comprise a local area network that is operable to provide direct IP connections between base stations 106-108 without using the PDSN 140.

The MSC 130 comprises a switching device that is operable to provide services and coordination between the subscribers in the wireless network 100 and external networks, such as the PSTN or Internet. In some embodiments of the present invention, communications line 120 may be several different data links, where each data link couples one of the base stations 106-108 to the MSC 130.

In the embodiment of the wireless network 100 shown in FIG. 1, wireless communication device 110 and wireless communication device 111 are located in cell site 102 and are operable to communicate with base station 106. Wireless communication device 112 is located in cell site 103 and is operable to communicate with base station 107, and wireless communication device 113 is located in cell site 104 and is operable to communicate with base station 108.

The wireless communication device 111 is close to the edge of cell site 104. The direction arrow proximate to wireless communication device 111 indicates the movement of wireless communication device 111 towards cell site 104. At some point, as wireless communication device 111 moves into cell site 104 and out of cell site 102, a "handoff" will occur.

A handoff transfers control of a call from a first cell to a second cell. For example, if wireless communication device 111 is in communication with base station 106 and senses that the signal from base station 106 is becoming unacceptably weak, wireless communication device 111 may then switch to a base station that has a stronger signal, such as the signal transmitted by base station 108. Wireless communication device 111 and base station 108 establish a new communication link and a signal is sent to base station 106 and the public switched telephone network to transfer the on-going voice, data, or control signals through base station 108. The call is thereby seamlessly transferred from base station 106 to base station 108. An "idle" handoff is a handoff between cells of a mobile device that is communicating in the control or paging channel, rather than transmitting voice and/or data signals in the regular traffic channels.

Figure 2:
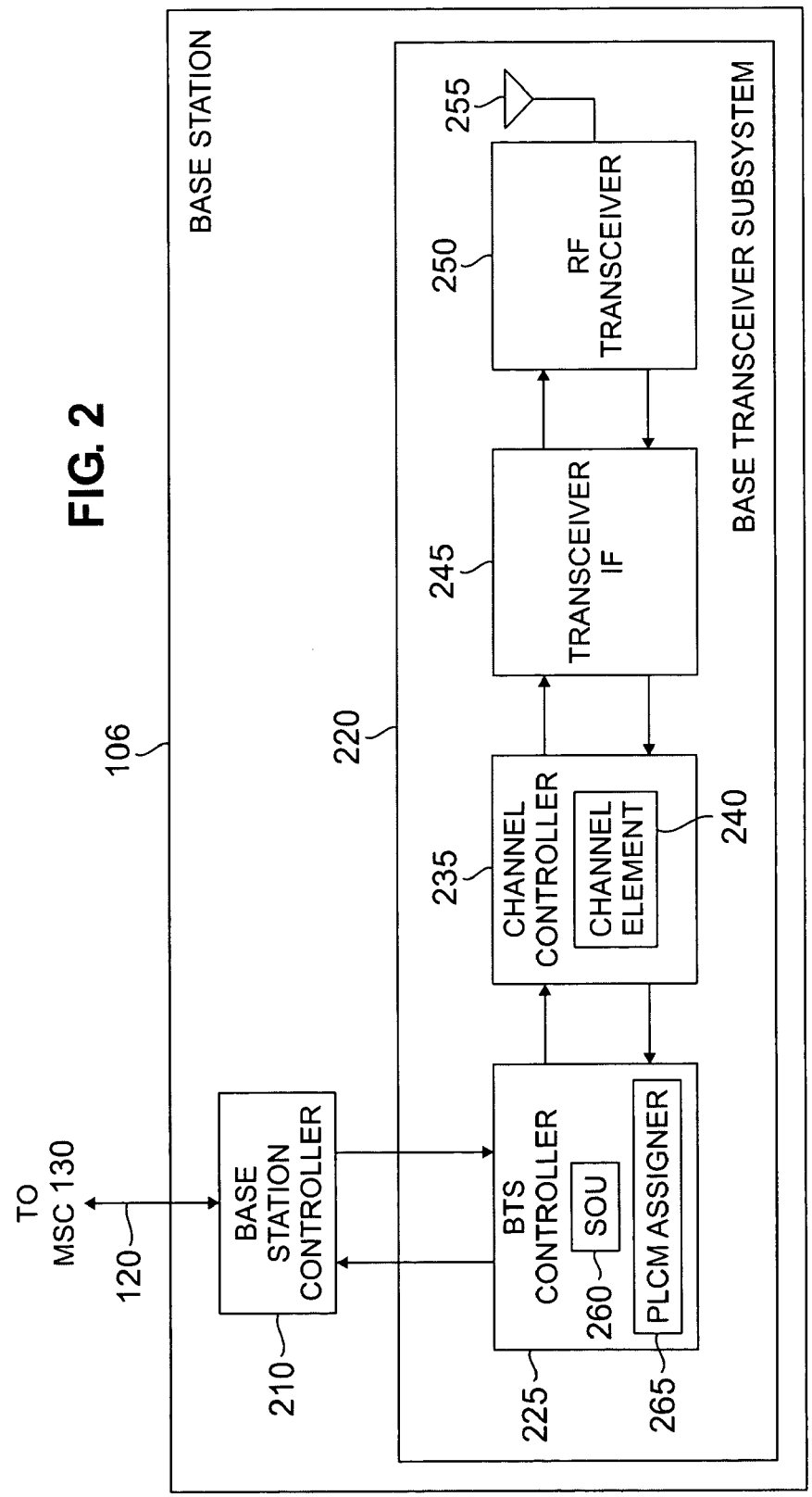
FIG. 2 is a block diagram illustrating one of the base stations of FIG. 1 in greater detail in accordance with one embodiment of the present invention.

FIG. 2 is a block diagram illustrating one of the base stations 106-108 in greater detail in accordance with one embodiment of the present invention. The base station 106 is illustrated as an example. However, it will be understood that the components illustrated and described with respect to the base station 106 are also part of the base stations 107 and 108.

The base station 106 comprises a base station controller 210 and at least one base transceiver subsystem 220, as previously described in connection with FIG. 1. Thus, although illustrated with one base transceiver subsystem 220, it will be understood that the base station 106 may comprise any suitable number of base transceiver subsystems without departing from the scope of the present invention.

The base station controller 210 is operable to manage the resources in cell site 102, including the base transceiver subsystem 220. According to one embodiment, the base transceiver subsystem 220 comprises a base transceiver subsystem (BTS) controller 225, a channel controller 235 (which may comprise at least one channel element 240), a transceiver interface (IF) 245, an RF transceiver unit 250, and an antenna array 255.

The BTS controller 225 may comprise processing circuitry and memory capable of executing an operating program that controls the overall operation of the base transceiver subsystem 220 and communicates with the base station controller 210. As described in more detail below, the BTS controller 225 may also comprise a selection distribution unit (SDU) 260 and a PLCM assigner 265.

Under normal conditions, the BTS controller 225 directs the operation of channel controller 235, which may comprise a number of channel elements, such as channel element 240, that are each operable to perform bidirectional communication in the forward channel and the reverse channel. A "forward channel" refers to outbound signals from the base station 106 to a wireless communication device 110-111 and a "reverse channel" refers to inbound signals from a wireless communication device 110-111 to the base station 106. The transceiver IF 245 is operable to transfer the bidirectional channel signals between the channel controller 240 and the RF transceiver unit 250.

The antenna array 255 is operable to transmit forward channel signals received from the RF transceiver unit 250 to wireless communication devices 110-111 in the coverage area of the base station 106. The antenna array 255 is also operable to send to the RF transceiver unit 250 reverse channel signals received from wireless communication devices 110-111 in the coverage area of the base station 106. According to one embodiment of the present invention, the antenna array 255 comprises a multi-sector antenna, such as a three-sector antenna in which each antenna sector is responsible for transmitting and receiving in a coverage area corresponding to an arc of approximately 120°. Additionally, the RF transceiver unit 250 may comprise an antenna selection unit to select among different antennas in the antenna array 255 during both transmit and receive operations.

The selection distribution unit 260 is operable to perform frame selection and to distribute frames between the base station 106 and the wireless communication devices 110-113. The PLCM assigner 265 is operable to assign PLCMs to the wireless communication devices 110-113.

According to one embodiment, the PLCM assigner 265 of the anchor base station 106 assigns a PLCM to a wireless communication device 110-113 when a call is initiated or a hard handoff to the base station 106 is performed. As described in more detail below, the PLCM is based on a unique characteristic of the base transceiver subsystem 220 through which the wireless communication device 110-113 is communicating and based on a reusable identifier for the wireless communication device 110-113.

The PLCM assigned to the wireless communication device 110-113 by the PLCM assigner 265 is used by the wireless communication device 110-113 throughout the call until a hard handoff is performed or the call is otherwise released, such as when the call is ended. Thus, the PLCM is retained even if no leg is currently assigned on the anchor base station 106, as long as the anchor base station 106 maintains the selection distribution unit 260. If a hard handoff is performed or the call is otherwise released, both the assigned PLCM and the selection distribution unit 260 are released.

Although illustrated in the BTS controller 225, it will be understood that the PLCM assigner 265 may be implemented elsewhere within the base transceiver subsystem 220 or elsewhere within the base station 106 itself without departing from the scope of the present invention.

For one embodiment, the PLCM assigner 265 may comprise logic encoded in media. The logic comprises functional instructions for carrying out program tasks. The media comprises computer disks or other computer-readable media, application-specific integrated circuits (ASICs), field-programmable gate arrays (FPGAs), digital signal processors (DSPs), other suitable specific or general purpose processors, transmission media or other suitable media in which logic may be encoded and utilized.

Figure 3:
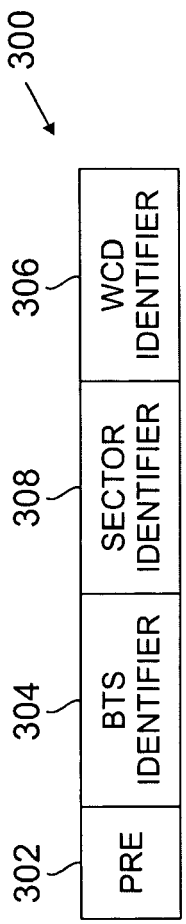
FIG. 3 is a block diagram illustrating a format for the public long code mask assigned by the base station of FIG. 2 in accordance with one embodiment of the present invention.

FIG. 3 is a block diagram illustrating a format 300 for the public long code mask assigned by the base stations 106-108 in accordance with one embodiment of the present invention. According to this embodiment, the PLCM format 300 comprises a predefined segment (PRE) 302, a base transceiver subsystem (BTS) identifier 304, and a reusable wireless communication device (WCD) identifier 306. The PLCM format 300 may also comprise an optional sector identifier 308 and/or any other suitable segment (not shown in FIG. 3).

According to one embodiment, the PLCM format 300 comprises a total of 42 bits. However, it will be understood that the PLCM format 300 may comprise any suitable number of bits based on any suitable standards without departing from the scope of the present invention.

For one embodiment, the predefined segment 302 comprises three bits of data that may be used to distinguish between private and public long code masks and to differentiate between MEID-generated PLCMs and base station-assigned PLCMs. However, it will be understood that the predefined segment 302 may comprise any suitable number of bits that may be used for any suitable purpose without departing from the scope of the present invention.

The BTS identifier 304 comprises an identifier for the base transceiver subsystem 220 with which the wireless communication device 110-113 is communicating based on the PLCM. The BTS identifier 304 may be an identifier that is unique to the base transceiver subsystem 220 or may be an identifier that is based on a unique characteristic of the base transceiver subsystem 220.

For example, according to one embodiment, the BTS identifier 304 is based on the latitude and longitude of the base transceiver subsystem 220. Thus, for the embodiment in which the PLCM format 300 comprises 42 bits, the available latitude and longitude information, which comprise 22 and 23 bits, respectively, use more bits than are provided in the PLCM format 300. In order to use this unique characteristic of the base transceiver subsystem 220, therefore, the latitude and longitude information are reduced.

For this embodiment, the PLCM format 300 comprises a number of bits, x, that provide reduced latitude information and a number of bits, y, that provide reduced longitude information. For a particular embodiment, x=y, and the reduced latitude and longitude information may be generated by the PLCM assigner 265 as follows:

$R=2^r$

R=cell diameter for base transceiver subsystem $D=2^d$

D=reusable distance reduced latitude=(latitude>>r) mod $2^{(d-r)}$ reduced longitude=(longitude>>r) mod $2^{(d-r)}$, where r comprises the resolution of the latitude and longitude information and d−r=x. According to one embodiment, the resolution comprises 0.25 seconds. However, it will be understood that the resolution may comprise any suitable value without departing from the scope of the present invention. The reusable distance, D, corresponds to a distance from the base transceiver subsystem 220 in which the PLCM may continue to be used, e.g., a soft handoff region.

The reusable WCD identifier 306 comprises an identifier for the wireless communication device 110-113 that is communicating based on the PLCM. The reusable WCD identifier 306 may be generated by the base transceiver subsystem 220 when the PLCM is assigned to the wireless communication device 110-113.

For example, the PLCM assigner 265 may randomly generate a WCD identifier 306 or select a WCD identifier 306 based on any suitable algorithm when assigning the PLCM to the wireless communication device 110-113. According to one embodiment, the WCD identifier 306 may be generated based on the Mobile Identification Number (MIN), International Mobile Station Identifier (IMSI), the Mobile Equipment Identifier (MEID) or any other suitable identifier. Alternatively, the WCD identifier 306 may be generated based on a simple assignment by the PLCM assigner 265. It will be understood, however, that the WCD identifier 306 may be generated in any suitable manner without departing from the scope of the present invention.

After a hard handoff is performed during which the wireless communication device 110-113 is assigned a different PLCM or the call is otherwise released, the WCD identifier 306 generated for that wireless communication device 110-113 is released such that it may be reused by another wireless communication device 110-113 in a subsequently generated PLCM.

In some situations, the BTS identifiers 304 of more than one base transceiver subsystem 220 may be the same. When the BTS identifiers 304 are based on the latitude and longitude of the base transceiver subsystems 220, the BTS identifiers 304 may be the same if the base transceiver subsystems 220 are close enough to each other or if the base transceiver subsystems 220 are a multiple of the reusable distance apart from each other, resulting in the reduced latitude and longitude information being the same. For example, for a particular embodiment, x=y=r=8 and the reusable distance D=327.68 miles. For this embodiment, collisions may be possible for base transceiver subsystems 220 that are exact multiples of 327.68 miles apart from each other (+/−0.64 miles, which corresponds to ½ the cell diameter R) because the BTS identifiers 304 may be the same.

In order to avoid this possibility, one set of potential WCD identifiers 306 may be partitioned (equally, based on historic traffic volume, or in any other suitable manner) between base transceiver subsystems 220 when identical BTS identifiers 304 may be generated such that no wireless communication devices 110-113 may be assigned identical PLCMs.

The optional sector identifier 308 may comprise an identifier that is operable to identify a sector. For example, according to one embodiment, a sector identifier 308 of 00 may identify an omni or alpha sector, a sector identifier 308 of 01 may identify a beta sector, and a sector identifier 308 of 10 may identify a gamma sector. However, it will be understood that the sector identifier 308 may comprise any other suitable format using any suitable number of bits without departing from the scope of the present invention. In addition, it will be understood that the PLCM format 300 may comprise no sector identifier 308.

For one embodiment, the PLCM format 300 comprises x bits for providing reduced latitude information and y bits for providing reduced longitude information and comprises z bits for the WCD identifier 306. For the embodiment in which the PLCM format 300 comprises 42 bits, the predefined segment comprises three bits, and no sector identifier 308 is used, x+y+z=39 bits. For another embodiment in which the PLCM format 300 comprises 42 bits, the predefined segment comprises three bits, and the sector identifier 308 comprises two bits, x+y+z=37 bits.

For a particular embodiment, x=y and x is at most 14, such that z is at least 11 or 9, respectively, for the embodiments described above (with x+y+z=39 or 37 bits). For another particular embodiment, x=y and x is at most 11, such that z is at least 17 or 15, respectively, for the embodiments described above (with x+y+z=39 or 37 bits). For yet another particular embodiment, x=y and x is at most 7, such that z is at least 25 or 23, respectively, for the embodiments described above (with x+y+z=39 or 37 bits) However, it will be understood that the BTS identifier 304 and the WCD identifier 306 may comprise any suitable number of bits without departing from the scope of the present invention.

Although the PLCM format 300 is illustrated in a particular order, it will be understood that the same elements 302, 304, 306 and optionally 308 may be provided in any suitable order within the PLCM format 300 without departing from the scope of the present invention.

Figure 4:
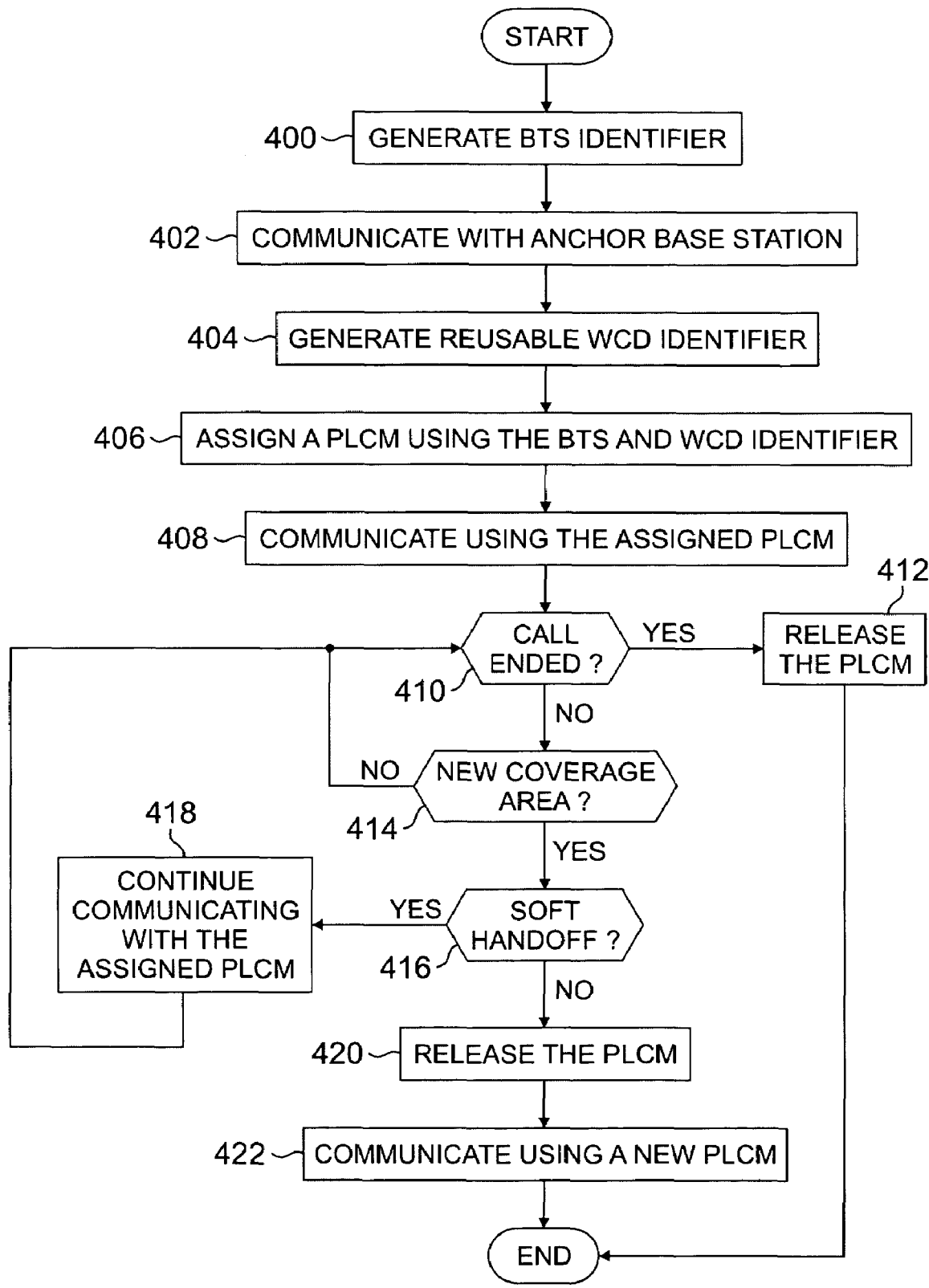
FIG. 4 is a flow diagram illustrating a method for providing a base station-assigned public long code mask in the wireless network of FIG. 1 in accordance with one embodiment of the present invention.

FIG. 4 is a flow diagram illustrating a method for providing a base station-assigned public long code mask in the wireless network 100 in accordance with one embodiment of the present invention. The method begins at step 400 where the PLCM assigner 265 generates a BTS identifier 304 for a base transceiver subsystem 220. The BTS identifier 304 may comprise an identifier that is unique to the base transceiver subsystem 220 or may be an identifier that is based on a unique characteristic of the base transceiver subsystem 220. For example, according to one embodiment described in more detail below in connection with FIG. 5, the BTS identifier 304 is based on the latitude and longitude of the base transceiver subsystem 220.

At step 402, one of the wireless communication devices 110-113 communicates with the base station 106-108 corresponding to the base transceiver subsystem 220 as an anchor base station 106-108. At step 404, the PLCM assigner 265 generates a reusable WCD identifier 306 for the wireless communication device 110-113. According to one embodiment, the PLCM assigner 265 randomly generates the WCD identifier 306, while ensuring that no other wireless communication device 110-113 within the wireless network 100 is currently using the same WCD identifier 306. As opposed to randomly generating the WCD identifier 306, it will be understood that the PLCM assigner 265 may generate the WCD identifier 306 in any other suitable manner without departing from the scope of the present invention.

At step 406, the PLCM assigner 265 assigns a PLCM to the wireless communication device 110-113 using the BTS identifier 304 and the WCD identifier 306. According to one embodiment, the PLCM assigner 265 assigns a PLCM that comprises a predefined segment 302, the BTS identifier 304 and the WCD identifier 306. The PLCM may also optionally comprise a sector identifier 308 and/or any other suitable segment. The assigned PLCM may be encrypted before being communicated to the wireless communication device 110-113 in order to maintain security. At step 408, the wireless communication device 110-113 communicates with the base transceiver subsystem 220 using the assigned PLCM.

At decisional step 410, a determination is made regarding whether or not the call has been ended. If the call has been ended, the method follows the Yes branch from decisional step 410 to step 412. At step 412, the PLCM used by the wireless communication device 110-113 is released, thereby allowing the WCD identifier 306 to be reused by another wireless communication device 110-113, after which the method comes to an end.

Returning to decisional step 410, if the call has not been ended, the method follows the No branch from decisional step 410 to decisional step 414. At decisional step 414, a determination is made regarding whether or not the wireless communication device 110-113 has moved into a coverage area for a new base transceiver subsystem 220, which may or may not correspond to a new base station 106-108. If the wireless communication device 110-113 has not moved into a coverage area for a new base transceiver subsystem 220, the method follows the No branch from decisional step 414 and returns to decisional step 410 for another determination regarding whether or not the call has ended.

However, if the wireless communication device 110-113 has moved into a coverage area for a new base transceiver subsystem 220, the method follows the Yes branch from decisional step 414 to decisional step 416. At decisional step 416, a determination is made regarding whether or not a soft handoff will be performed. If a soft handoff is to be performed, the method follows the Yes branch from decisional step 416 to step 418. At step 418, the wireless communication device 110-113 communicates with the new base transceiver subsystem 220 using the originally assigned PLCM following the soft handoff, at which point the method returns to decisional step 410 for another determination regarding whether or not the call has ended.

Returning to decisional step 416, if a soft handoff is not to be performed, a hard handoff is to be performed and the method follows the No branch from decisional step 416 to step 420. At step 420, the PLCM used by the wireless communication device 110-113 is released, thereby allowing the WCD identifier 306 to be reused by another wireless communication device 110-113.

At step 422, the wireless communication device 110-113 communicates with the new base transceiver subsystem 220, which corresponds to a new anchor base station 106-108, using a new PLCM that is assigned by the new anchor base station 106-108, at which point the method comes to an end.

In this way, PLCMs may be assigned using a simple, standardized format based on a characteristic unique to the base transceiver subsystem 220, such as latitude and longitude. This eliminates any need for complex algorithms and reduces the probability of collisions to nearly zero, which improves security and privacy of users of wireless communication devices 110-113. In addition, PLCM assignment is provided independently of both vendor and network, thereby eliminating interoperability issues.

Figure 5:
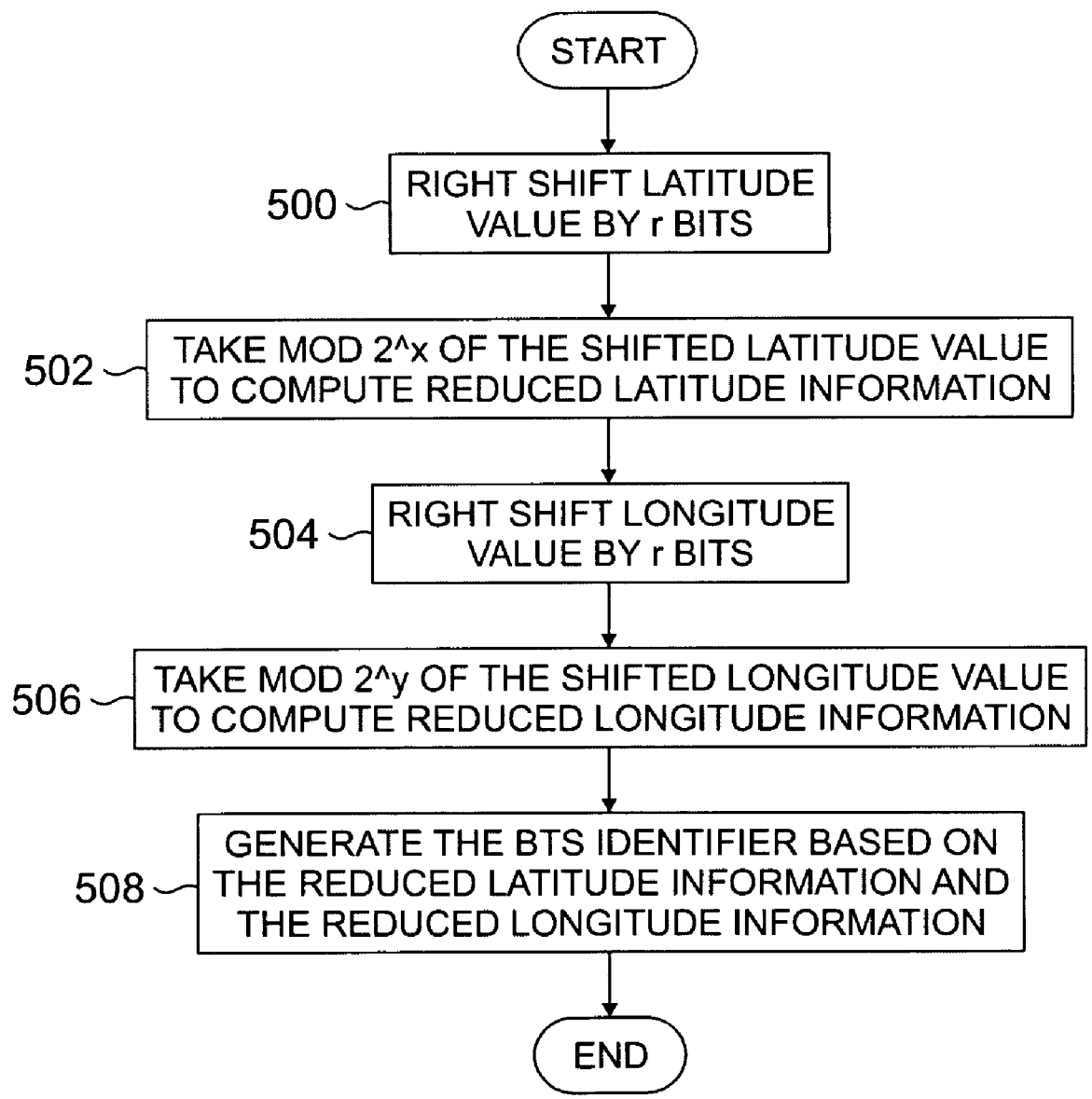
FIG. 5 is a flow diagram illustrating a method for generating an identifier for a base transceiver subsystem, such as the base transceiver subsystem of FIG. 2, in order to provide a base station-assigned public long code mask in accordance with one embodiment of the present invention.

FIG. 5 is a flow diagram illustrating a method for generating an identifier for a base transceiver subsystem, such as the base transceiver subsystem 220, in order to provide a base station-assigned public long code mask in accordance with one embodiment of the present invention. Thus, the method of FIG. 5 comprises one embodiment of step 400 of the method of FIG. 4.

The method begins at step 500 where the latitude value for the base transceiver subsystem 220 is right shifted by r bits, where r corresponds to the resolution of the latitude value. According to one embodiment, the resolution is 0.25 seconds. At step 502, the reduced latitude information is computed by taking the mod $2^x$ of the shifted latitude value, where x corresponds to the number of bits providing the latitude information in the BTS identifier 304.

At step 504, the longitude value for the base transceiver subsystem 220 is right shifted by r bits, where r corresponds to the resolution of the longitude value. According to one embodiment, the resolution is 0.25 seconds. At step 506, the reduced longitude information is computed by taking the mod $2^y$ of the shifted longitude value, where y corresponds to the number of bits providing the longitude information in the BTS identifier 304. For a particular embodiment, x=y.

At step 508, the BTS identifier 304 is generated based on the reduced latitude information and the reduced longitude information, at which point the method comes to an end. According to one embodiment, the BTS identifier 304 comprises a concatenation of the reduced latitude information and the reduced longitude information.

Although the present invention has been described with several embodiments, various changes and modifications may be suggested to one skilled in the art. It is intended that the present invention encompass such changes and modifications as fall within the scope of the appended claims.

What is claimed is:

1. A method for providing a base station-assigned public long code mask (PLCM) for a wireless communication device, comprising:
   generating a base transceiver subsystem (BTS) identifier for a base transceiver subsystem;
   generating a reusable wireless communication device (WCD) identifier for the wireless communication device when the wireless communication device communicates with the base transceiver subsystem; and
   assigning a PLCM to the wireless communication device, the PLCM comprising the BTS identifier and the WCD identifier.

2. The method of claim 1, the BTS identifier comprising an identifier unique to the base transceiver subsystem.

3. The method of claim 1, the BTS identifier comprising an identifier based on a unique characteristic of the base transceiver subsystem.

4. The method of claim 3, the unique characteristic of the base transceiver subsystem comprising latitude and longitude information.

5. The method of claim 4, generating a BTS identifier for a base transceiver subsystem comprising generating reduced latitude information and reduced longitude information.

6. The method of claim 5, generating reduced latitude information and reduced longitude information comprising shifting the latitude and longitude information and performing a mod operation on the shifted latitude and longitude information.

7. The method of claim 1, the PLCM further comprising a predefined segment operable to distinguish between private and public long code masks and to differentiate between Mobile Equipment Identifier (MEID)-generated PLCMs and base station-assigned PLCMs.

8. The method of claim 1, the PLCM further comprising a sector identifier operable to identify a sector.

9. The method of claim 1, further comprising releasing the WCD identifier when one of a hard handoff and a call ending occurs.

10. The method of claim 1, further comprising continuing to allow the wireless communication device to use the PLCM when a soft handoff occurs.

11. A base station operable to provide a base station-assigned public long code mask (PLCM) for a wireless communication device, comprising:
   a base transceiver subsystem comprising a unique characteristic; and
   a PLCM assigner operable to generate a base transceiver subsystem (BTS) identifier for the base transceiver subsystem based on the unique characteristic, to generate a reusable wireless communication device (WCD) identifier for the wireless communication device when the wireless communication device communicates with the base transceiver subsystem, and to assign a PLCM to the wireless communication device, the PLCM comprising the BTS identifier and the WCD identifier.

12. The base station of claim 11, the BTS identifier comprising an identifier unique to the base transceiver subsystem.

13. The base station of claim 11, the unique characteristic of the base transceiver subsystem comprising latitude and longitude information.

14. The base station of claim 13, the PLCM assigner operable to generate the BTS identifier by generating reduced latitude information and reduced longitude information.

15. The base station of claim 14, the PLCM assigner operable to generate reduced latitude information and reduced longitude information by shifting the latitude and longitude information and performing a mod operation on the shifted latitude and longitude information.

16. The base station of claim 11, the PLCM further comprising a predefined segment operable to distinguish between private and public long code masks and to differentiate between Mobile Equipment Identifier (MEID)-generated PLCMs and base station-assigned PLCMs.

17. The base station of claim 11, the PLCM further comprising a sector identifier operable to identify a sector.

18. The base station of claim 11, the PLCM assigner further operable to release the WCD identifier when one of a hard handoff and a call ending occurs.

19. The base station of claim 11, the PLCM assigner further operable to allow the wireless communication device to continue to use the PLCM when a soft handoff occurs.

20. A wireless network comprising a plurality of base stations capable of communication with mobile stations in a coverage area of said wireless network, wherein each of said plurality of base stations is configured to provide a base station-assigned public long code mask (PLCM) to a mobile station, said each base station comprising:
   a base transceiver subsystem comprising a unique characteristic; and
   a PLCM assigner operable to generate a base transceiver subsystem (BTS) identifier for the base transceiver subsystem based on the unique characteristic, to generate a reusable wireless communication device (WCD) identifier for the wireless communication device when the wireless communication device communicates with the base transceiver subsystem, and to assign a PLCM to the wireless communication device, the PLCM comprising the BTS identifier and the WCD identifier.

21. The wireless network of claim 20, the BTS identifier comprising an identifier unique to the base transceiver subsystem.

22. The wireless network of claim 20, the unique characteristic of the base transceiver subsystem comprising latitude and longitude information.

23. The wireless network of claim 22, the PLCM assigner operable to generate the BTS identifier by generating reduced latitude information and reduced longitude information.

24. The wireless network of claim 23, the PLCM assigner operable to generate reduced latitude information and reduced longitude information by shifting the latitude and longitude information and performing a mod operation on the shifted latitude and longitude information.

25. The wireless network of claim 20, the PLCM further comprising a predefined segment operable to distinguish between private and public long code masks and to differentiate between Mobile Equipment Identifier (MEID)-generated PLCMs and base station-assigned PLCMs.

26. The wireless network of claim 20, the PLCM further comprising a sector identifier operable to identify a sector.

27. The wireless network of claim 20, the PLCM assigner further operable to release the WCD identifier when one of a hard handoff and a call ending occurs.

28. The wireless network of claim 20, the PLCM assigner further operable to allow the wireless communication device to continue to use the PLCM when a soft handoff occurs.

* * * * *